(12) United States Patent
Hebert et al.

(10) Patent No.: US 11,729,213 B2
(45) Date of Patent: Aug. 15, 2023

(54) AUTOMATIC GENERATION OF DECEPTIVE API ENDPOINTS

(71) Applicant: SAP SE, Walldorf (DE)

(72) Inventors: Cedric Hebert, Mouans Sartoux (FR); Merve Sahin, Antibes (FR); Anderson Santana de Oliveira, Antibes (FR); Rocio Cabrera Lozoya, Antibes (FR); Aicha Mhedhbi, Juan les Pins (FR)

(73) Assignee: SAP SE, Walldorf (DE)

( * ) Notice: Subject to any disclaimer, the term of this patent is extended or adjusted under 35 U.S.C. 154(b) by 288 days.

(21) Appl. No.: 17/062,903

(22) Filed: Oct. 5, 2020

(65) Prior Publication Data

US 2022/0109692 A1    Apr. 7, 2022

(51) Int. Cl.
*H04L 9/40* (2022.01)
*G06F 9/54* (2006.01)
*H04L 67/133* (2022.01)

(52) U.S. Cl.
CPC .......... *H04L 63/1491* (2013.01); *G06F 9/547* (2013.01); *H04L 63/1416* (2013.01); *H04L 67/133* (2022.05)

(58) Field of Classification Search
CPC . G06F 9/547; H04L 63/1416; H04L 63/1491; H04L 67/133
See application file for complete search history.

(56) References Cited

U.S. PATENT DOCUMENTS

| | | | |
|---|---|---|---|
| 8,468,598 B2 | 6/2013 | Hebert | |
| 10,382,483 B1 * | 8/2019 | Kafri | H04L 63/1491 |
| 10,873,601 B1 * | 12/2020 | Stickle | H04L 63/1416 |
| 10,986,129 B1 * | 4/2021 | Sellers | H04L 63/1491 |
| 2006/0069666 A1 * | 3/2006 | Burke | G06Q 10/10 |
| 2008/0256172 A1 | 10/2008 | Hebert et al. | |
| 2009/0077376 A1 | 3/2009 | Montagut et al. | |
| 2009/0222399 A1 | 9/2009 | Gomez et al. | |
| 2009/0327317 A1 | 12/2009 | Ulmer et al. | |
| 2012/0042364 A1 | 2/2012 | Hebert | |
| 2013/0160079 A1 * | 6/2013 | Hebert | H04L 63/145 726/3 |
| 2013/0262397 A1 | 10/2013 | Hebert | |
| 2014/0298460 A1 * | 10/2014 | Xue | H04L 63/1483 726/23 |

(Continued)

OTHER PUBLICATIONS

Sanchez-Rola et al., "Clock Around the Clock: Time-Based Device Fingerprinting", Oct. 2018, ACM SIGSAC Conference, 13 pgs.

(Continued)

*Primary Examiner* — Jeong S Park
(74) *Attorney, Agent, or Firm* — Klarquist Sparkman, LLP (57) ABSTRACT

Systems, methods, and computer media for securing software applications are provided herein. Using deceptive endpoints, attacks directed to API endpoints can be detected, and attackers can be monitored or blocked. Deceptive endpoints can be automatically generated by modifying valid endpoints for an application. Deceptive endpoints are not valid endpoints for the application, so if a deceptive endpoint is accessed, it is an indication of an attack. When a deceptive endpoint is deployed, accessing the deceptive endpoint can cause an alert to be generated, and an account, user, or device associated with accessing the deceptive endpoint can be blocked or monitored.

18 Claims, 7 Drawing Sheets

(56) References Cited

U.S. PATENT DOCUMENTS

| | | |
|---|---|---|
| 2014/0372927 A1 | 12/2014 | Hebert et al. |
| 2015/0033346 A1 | 1/2015 | Hebert et al. |
| 2016/0078234 A1 | 3/2016 | Li et al. |
| 2016/0099953 A1 | 4/2016 | Hebert et al. |
| 2016/0112376 A1 | 4/2016 | Gomez et al. |
| 2017/0019421 A1 | 1/2017 | Hebert et al. |
| 2017/0134423 A1* | 5/2017 | Sysman ............... G06F 21/554 |
| 2017/0169217 A1 | 6/2017 | Rahaman et al. |
| 2017/0177308 A1 | 6/2017 | Montagnon et al. |
| 2017/0177310 A1 | 6/2017 | Mathias et al. |
| 2017/0180421 A1* | 6/2017 | Shieh ..................... H04L 63/10 |
| 2018/0004978 A1 | 1/2018 | Hebert et al. |
| 2018/0041546 A1 | 2/2018 | Gomez et al. |
| 2018/0077174 A1 | 3/2018 | Hebert |
| 2018/0115523 A1* | 4/2018 | Subbarayan ........... G06N 20/00 |
| 2019/0068641 A1 | 2/2019 | Araujo et al. |
| 2020/0257524 A1* | 8/2020 | Callahan ................. G06F 8/427 |
| 2021/0067551 A1 | 3/2021 | Hebert et al. |
| 2021/0067552 A1 | 3/2021 | Hebert et al. |
| 2021/0067554 A1* | 3/2021 | Norman ............. H04L 63/1491 |
| 2021/0157917 A1 | 5/2021 | Hebert et al. |
| 2021/0160277 A1 | 5/2021 | Hebert et al. |
| 2022/0103545 A1 | 3/2022 | Hebert et al. |

OTHER PUBLICATIONS

"Observations From the Front Lines of Threat Hunting: A 2018 Mid-Year Review From Falcon OverWatch", https://go.crowdstrike.com/rs/281-OBQ-266/images/Report2018OverwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.pmewswire.com/news-releases/the-rasp-market-size-is-expected-to-grow-from-u sd-2947-million-in-2017-to-u sd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 2019, 38 pgs.

* cited by examiner

SOFTWARE 780 IMPLEMENTING DESCRIBED TECHNOLOGIES

AUTOMATIC GENERATION OF DECEPTIVE API ENDPOINTS

BACKGROUND

As reliance on the Internet and software applications has continued to grow, cyber security has also gained importance. Securing computer systems and applications against attackers employing varying malicious techniques has become a difficult task. For typical applications, users interact with the application through application programming interface (API) endpoints. In addition to exploiting software bugs, some attackers probe API endpoints directly, searching for vulnerabilities. Applications are typically unable to detect and manage such attacks.

DETAILED DESCRIPTION

The examples described herein generally secure software applications against unauthorized access using deceptive application programming interface (API) endpoints. API endpoints (also referred to herein as simply "endpoints") are operations exposed by an application that provide a way to communicate with the application. Endpoints provide a point of entry to establish a communication channel. As an example, web applications commonly expose hypertext transfer protocol (HTTP) endpoints. HTTP is commonly used in representational state transfer (REST) architectures. HTTP endpoints include a "method" (sometimes referred to as a verb) such as GET, POST, DELETE, PUT, or PATCH, along with a "path" (e.g., a uniform resource locator (URL) for a website), and in some cases one or more "parameters" that are passed in the URL as key/value pairs, for example. Examples of other API endpoint types include simple object access protocol (SOAP), extensible markup language—remote procedure call (XML-RPC) protocol, and others.

Applications, particularly web applications, typically expose endpoints to allow a client computer to communicate with server(s) executing the web application. Some attackers attempt to probe endpoints directly, searching for vulnerabilities such as an unprotected administrative endpoint, poorly implemented interfaces that support undocumented actions, or implementation oversights that give more privileges than intended. Attackers can also attempt to access endpoints in an order that is unexpected by an application and that can cause the application to malfunction.

The examples described herein automatically generate deceptive endpoints to identify and manage attacks on an application's endpoints. Deceptive endpoints are not valid endpoints for the application, so if a deceptive endpoint is accessed, it is an indication that the access is malicious. Valid endpoints for an application can be modified to create deceptive endpoints that an attacker might try to access (and the existence of the deceptive endpoints can be kept secret from the application). Various examples are presented using HTTP endpoints and discuss modification of the method, path, and parameters of such endpoints to create deceptive endpoints. Modification of other endpoint types is also contemplated. For example, for SOAP endpoints, the content of an XML tag, attribute, content, or value can be modified. For other endpoint types/protocols, other aspects or elements of the endpoint can be modified.

When a deceptive endpoint is accessed, an alert can be generated indicating that an account, user, or computing device associated with the access is malicious. The account, user, or device can then be blocked or monitored. If a deceptive endpoint is accessed during an authenticated session with the application, an application clone session can be established, and the authenticated session can be transferred to the clone session. An application clone includes fake data rather than the actual data accessible in an application session. The application clone session has the same interface as an actual session and appears to the attacker to be the actual application session, so the attacker is unaware that they have been detected. By using a clone session, the attacker's activity can be monitored, and actual data can be protected.

As a specific example of generating deceptive endpoints, consider an application with an endpoint having a method of "POST" and a path of "v2/store/order" for placing an order. The "v2" appears to indicate that this endpoint is version 2. An attacker might try to access the "v1" version if it is still active, which could have some unpatched, old vulnerabilities. Similarly, "v3" might provide access to an endpoint that is not yet fully developed and may have vulnerabilities. Deceptive endpoints can be created having a method of "POST" and a path of "v1/store/order" and "v3/store/order." These endpoints would not be accessed during genuine application use, so access indicates malicious action. Similarly, another deceptive endpoint can be created by changing, for example, the method from POST to DELETE, which if not prevented could allow an attacker to delete orders without authorization.

Deceptive endpoint candidates can be generated automatically for an application by modifying various aspects of valid endpoints for the application. To increase the likelihood that the deceptive endpoint candidates appear believable to an attacker, the modifications can be compared to a group of valid endpoints for other applications. The deceptive endpoint candidates that appear closest to real endpoints for other applications can be used as deceptive endpoints for the application.

Examples are described below with reference to FIGS. 1-7.

Figure 1:
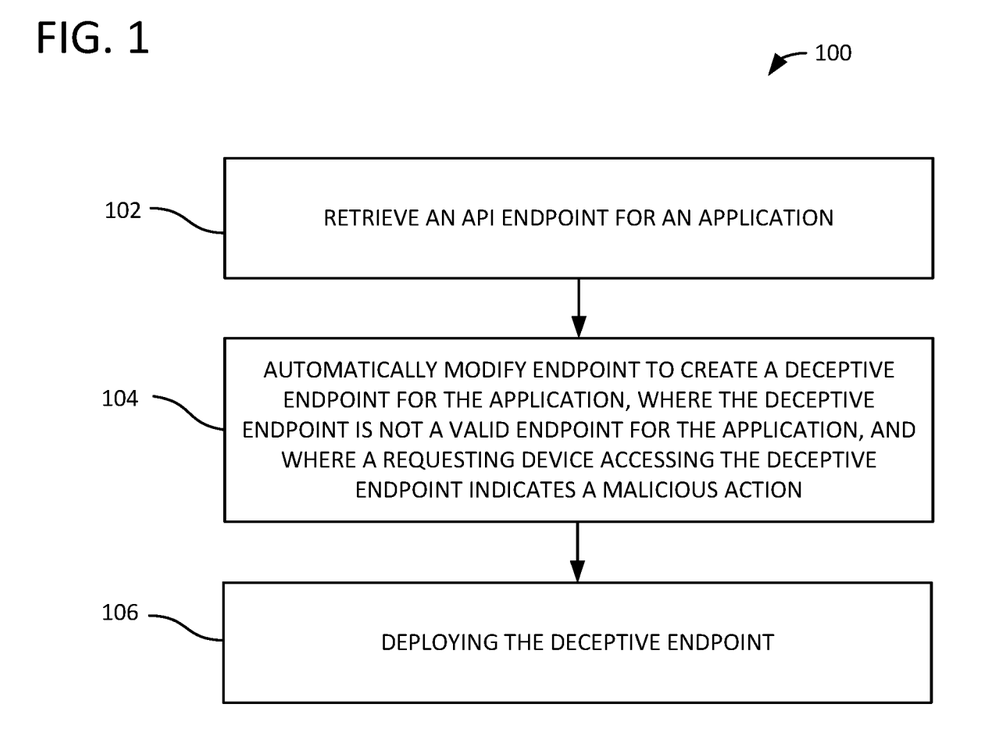
FIG. 1 illustrates an example method of securing an application in which a deceptive endpoint is automatically created and deployed.

FIG. 1 illustrates a method 100 for securing an application using deceptive endpoints. The application can be a web application, a locally executing application, or a network application. In process block 102, an API endpoint for an application is retrieved. For many applications, API endpoints are documented in a file, such as a Swagger file. Using Swagger, for example, a request can be sent to the API, and the API can return a YAML (YAML Ain't Markup Language) or JSON (JavaScript Object Notation) file documenting the API. Other documentation formats and approaches can also be used.

In process block 104, the endpoint is automatically modified to create a deceptive endpoint for the application. The deceptive endpoint is not a valid endpoint for the application, so a requesting computing device accessing the deceptive endpoint indicates a malicious action. The endpoint can be modified by identifying a portion of the endpoint to modify (e.g., method, path, or parameter), creating one or more candidate deceptive endpoints in which the selected portion is modified (e.g., substituting a different method, altering the path, or creating or substituting a new parameter), and selecting at least one of the candidate deceptive endpoints as the deceptive endpoint.

Figure 2:
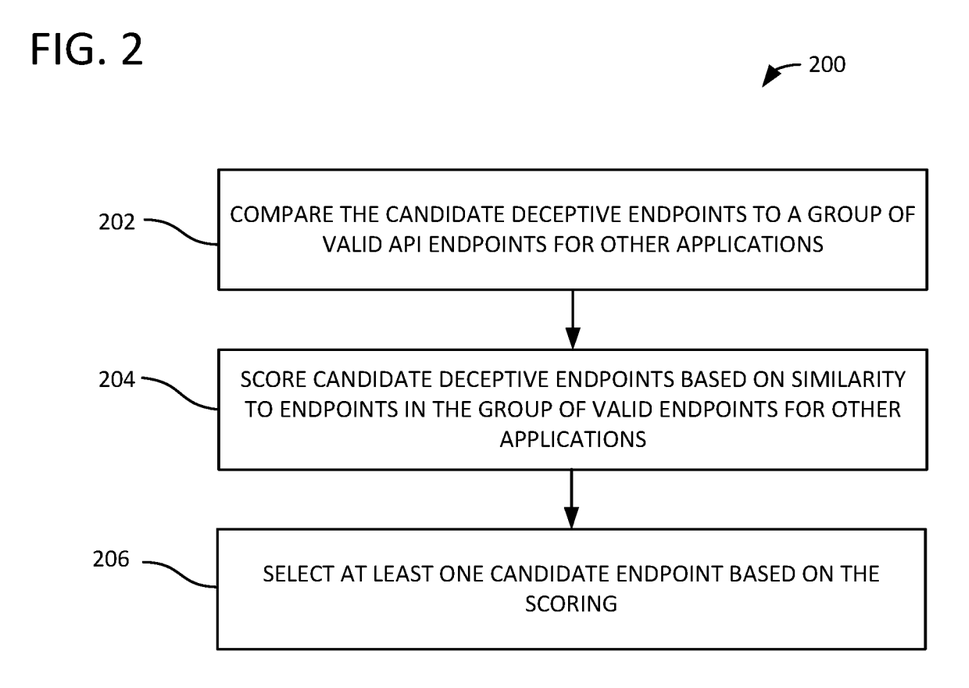
FIG. 2 illustrates an example method of selecting candidate deceptive endpoints for use as deceptive endpoints.

The deceptive endpoint can be selected based on a scoring approach. An example scoring approach 200 is illustrated in FIG. 2. In process block 202, the candidate deceptive endpoints are compared to a group of valid API endpoints from other applications. The valid API endpoints from other applications can be collected from documentation files for the other applications, for example. The comparison increases the chance that the candidate will be believable to an attacker and something likely that the attacker would try (because the comparison is to valid endpoints). In process block 204, the candidate deceptive endpoints are scored based on similarity to the endpoints in the group (e.g., on a scale from 0 to 1.0, 1-10, 1-100, etc.). This scoring can be, for example, a distance calculation such as a Pearson correlation distance, which considers two objects to be similar if their features are highly correlated. Other distance calculation approaches can also be used. In process block 206, the one, two, three, etc. candidate deceptive endpoints having the highest score can then be used as deceptive endpoints.

Returning to FIG. 1, in some examples, the endpoint is "flattened" before modification to create endpoint entries for different combinations of components of the endpoint. For example, if an endpoint has a method, path, and three parameters, three endpoint entries can be created, one for each combination of method, path, and parameter. Each of the endpoint entries can then be modified to create deceptive endpoint candidates. The endpoint can be flattened into, for example, a comma-separated value (CSV) format file.

In process block 106, the deceptive endpoint is deployed. The deceptive endpoint can be deployed in a variety of locations, including at a proxy between a requesting computing device and the application, at a load balancer, at a web application firewall, or at a router. Because the deceptive endpoint is not actually valid, it does not need to be deployed at the application. Firewalls, routers, and other deployment points can monitor for requests to the deceptive endpoints and take appropriate action without involving the application, such as generating an alert or transferring an application session to an application clone session. In other examples, deceptive endpoints can be added to the application, and the application can monitor access.

In some examples, a proxy architecture is used such that a proxy is implemented between requesting computing devices and the application. An application clone can also be implemented having the same interface as the application but including at least some fake data. The proxy can decide whether to establish an application session or an application clone session based on whether a session request is suspected of being malicious. For application sessions where a deceptive endpoint is accessed (indicating an attack), an application clone session can be established, and the session can be migrated to the clone session. This prevents further access to data associated with the application while not alerting the attacker that they have been discovered. The attacker's actions can then be monitored while in the clone session.

In some examples, after the application is updated, upon determining that the update makes the deceptive endpoint a valid endpoint for the application, the deceptive endpoint is removed. Such a situation can occur, for example, when a new feature is brought online or when the version number is incremented.

Figure 3:
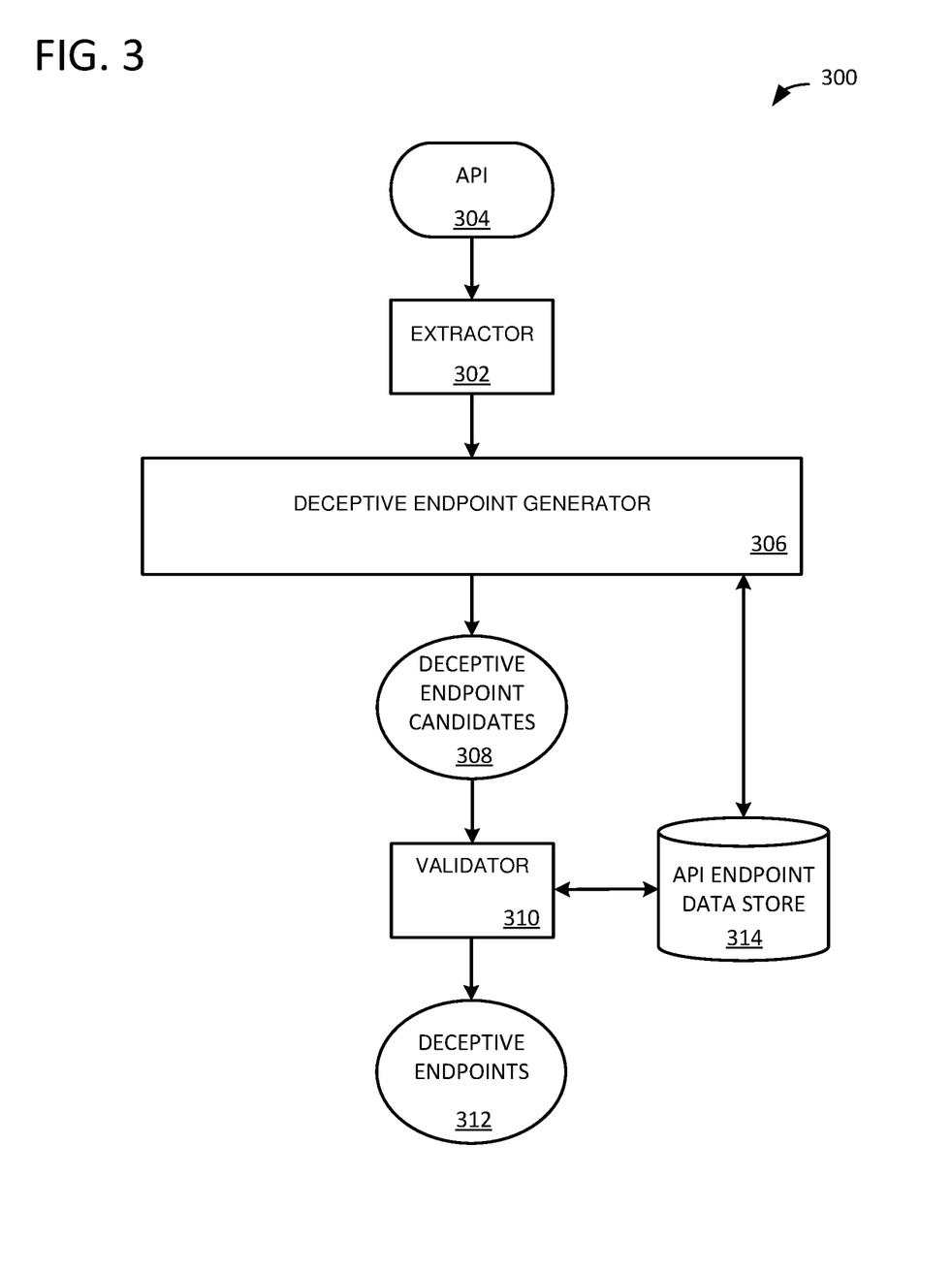
FIG. 3 is an example deceptive endpoint generation system.

FIG. 3 illustrates a system 300 configured to generate deceptive endpoints. Extractor 302 obtains API endpoints from application API 304. This can be done, for example, through a Swagger file or other documentation file obtained through API 304. Deceptive endpoint generator 306 modifies portions of the application API endpoints to create deceptive endpoint candidates 308. For example, a method, path, or parameter of the endpoints can be modified. In some examples, endpoints are flattened prior to modification.

Validator 310 selects some of deceptive endpoint candidates 308 as deceptive endpoints 312. Validator 310 can apply rules to deceptive endpoint candidates 308 to reject or approve some candidates (e.g., to reject deceptive endpoint candidates that are actually valid endpoints for the application or modifications that are unlikely to be believable). In some examples, validator 310 compares deceptive endpoint candidates 308 to valid endpoints from other applications stored in API endpoint data store 314. For example, validator 310 can perform a distance calculation and select deceptive endpoint candidates having scores that meet a threshold as deceptive endpoints 312. Higher scores indicate the candidates are similar to existing valid endpoints for other applications. The valid endpoints from other applications in data store 314 can be extracted from a documentation file or other source by extractor 302.

Figure 4:
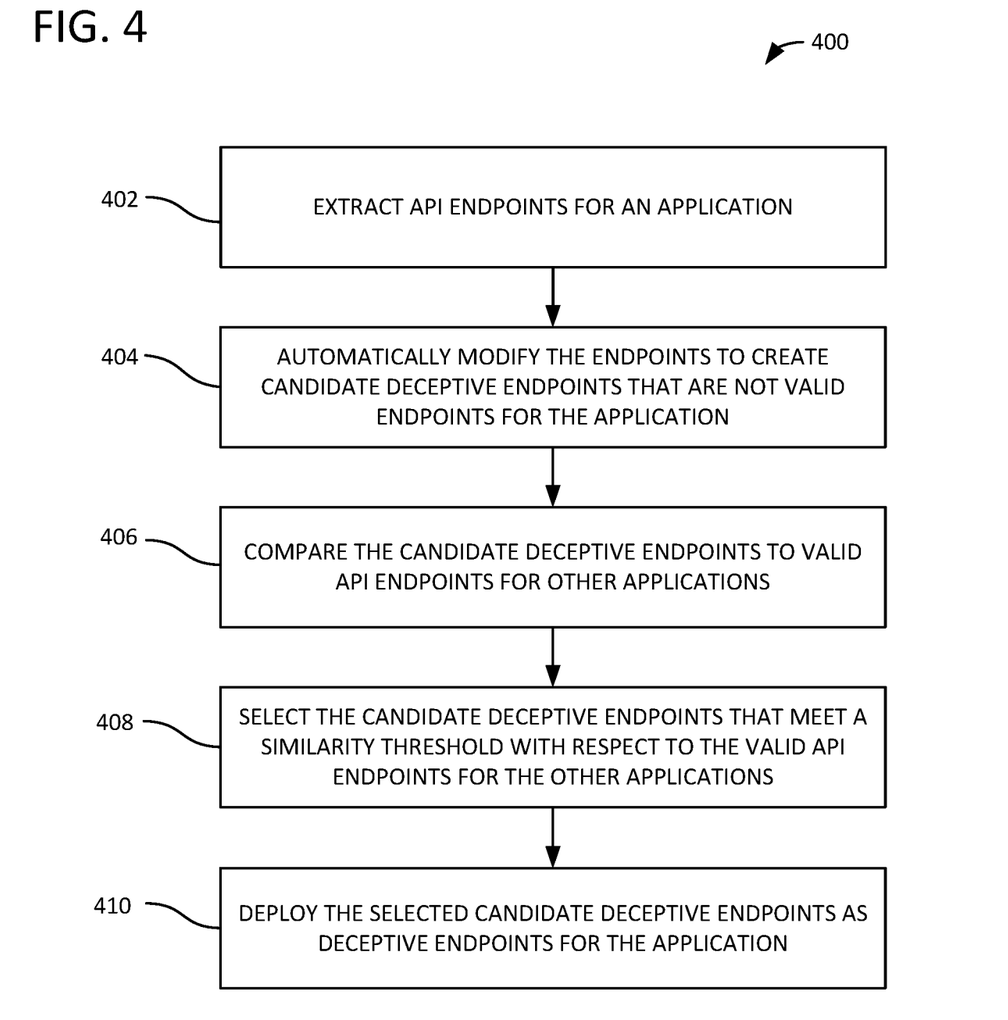
FIG. 4 illustrates an example method of securing an application in which candidate deceptive endpoints are compared against valid API endpoints for other applications.

FIG. 4 illustrates a method 400 for securing an application. In process block 402, a plurality of API endpoints for an application are extracted (e.g., from a documentation file). In process block 404, the endpoints are automatically modified to create candidate deceptive endpoints that are not valid endpoints for the application. In some examples, modifying includes flattening the extracted endpoints to create endpoint entries for different combinations of components of the respective endpoints. The endpoints can then be modified by changing at least one of a path, method, or parameter of the endpoint entries. As an example, the path of the endpoint can be modified by substituting a synonym or related word for one or more words in the path (e.g., substitute "purchase" for "buy" in the path). Similarly, a version number or numeral in the path can be iterated (up or down), such as changing "v2" to "v1" or "v3." The names of parameters can also be used to modify the path. For example, if a parameter "uploadFile" exists, "/File" can be added into the path.

The method of the endpoint can also be modified, for example changing one of GET, HEAD, POST, PUT, PATCH, DELETE, CONNECT, OPTIONS, or TRACE, or other method for another for HTTP endpoints. A new parameter can also be added or substituted for an existing parameter. Synonyms, related words, or parameters of the valid endpoints for other applications stored in data store 314 can be used as a source of parameter names. A related word example is for an endpoint having an "OrderStatus" parameter, a related term such as "ShippingStatus" or "PaymentComplete" can be added as parameters for deceptive endpoint candidates.

In process block 406, the candidate deceptive endpoints are compared to valid API endpoints for other applications (e.g., extracted from other applications or extracted from documentation files for other applications). The candidate deceptive endpoints that meet a similarity threshold with respect to one or more of the valid API endpoints for the other applications (e.g., a score of 0.9 out of 1.0) are selected in process block 408. The similarity threshold can be a score for a distance calculation. In process block 410, the selected candidate deceptive endpoints are deployed as deceptive endpoints for the application. A requesting computing device accessing one of the deceptive endpoints indicates a malicious action.

Figure 5:
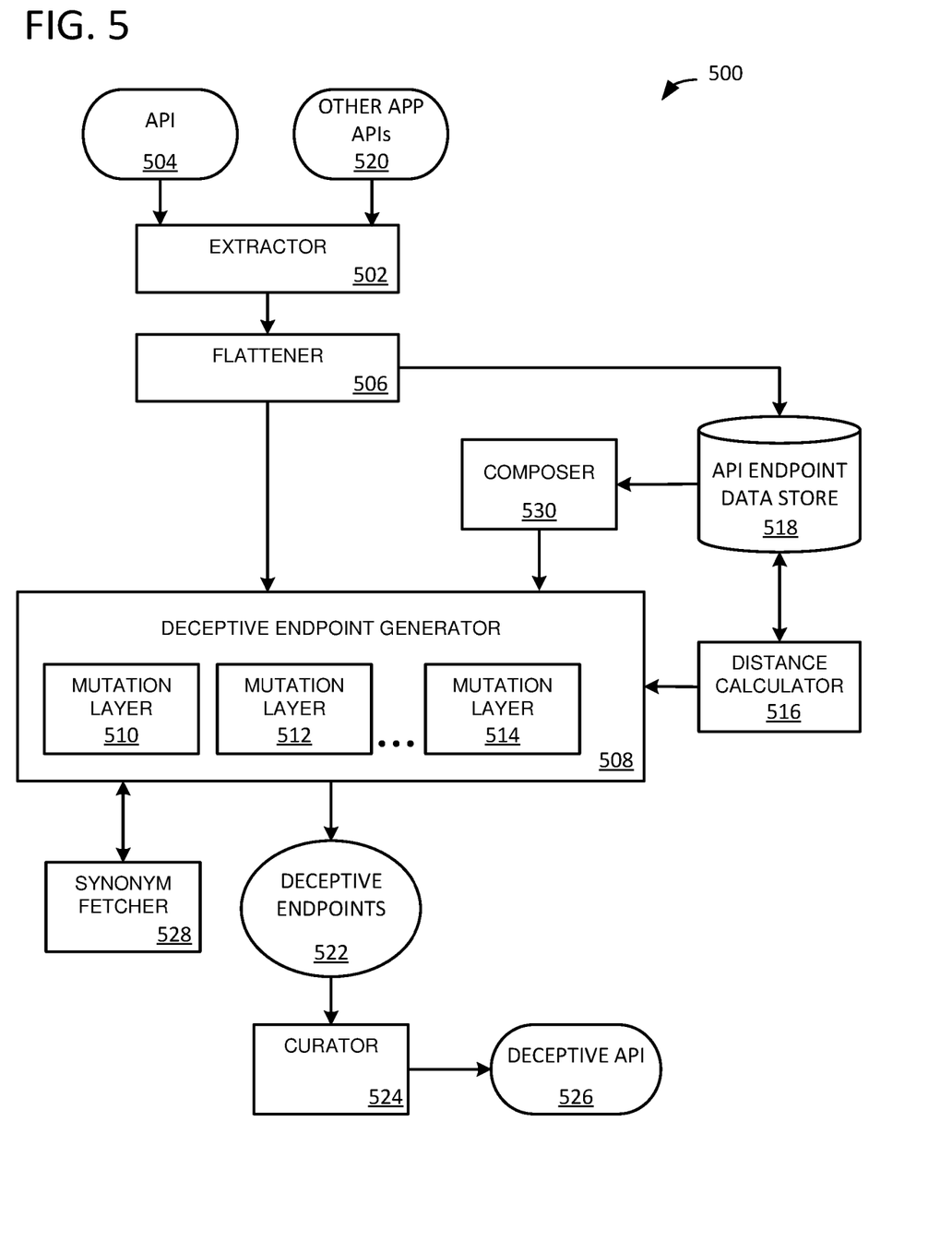
FIG. 5 is an example deceptive endpoint generation system configured to flatten extracted API endpoints and generate deceptive endpoints.

FIG. 5 illustrates an application security system 500. Extractor 502 obtains endpoints from an application API 504. Flattener 506 generates endpoint entries for different combinations of components of the endpoints. An example of this is shown in Table 1, below. For an example endpoint for uploading an image of a pet, the following is included: the method "POST" with path "/pet/{pedId}/uploadImage" with parameters "petId," "additionalMetadata," and "file."

TABLE 1

Example endpoint flattening.

| Base Path | Path | HTTP Method | Parameter Name | Parameter Description |
|---|---|---|---|---|
| /pet | {petId}/uploadImage | POST | petId | Id of pet to update |
| /pet | {petId}/uploadImage | POST | additional Metadata | Additional data to pass to server |
| /pet | {petId}/uploadImage | POST | file | File to upload |

As shown in Table 1, flattening the endpoint results in three endpoint entries, one for each combination of method, path, and parameter. Other data can also be included in the endpoint entries, such as a summary of the endpoint function, parameter type (e.g., integer, string, file) and whether the parameter is required (e.g., true or false).

The endpoint entries are provided to deceptive endpoint generator 508. Deceptive endpoint generator 508 contains mutation layers 510, 512, and 514. Each of mutation layers 510, 512, and 514 automatically modifies an endpoint in a particular way. For example, in an HTTP endpoint example, mutation layer 510 can be configured to change the method (e.g., from POST to GET). Mutation layers 510, 512, and 514 (as well as other mutation layers not shown) can be configured to modify the path in a particular way (substituting one term for another, iterating a numeral, adding a parameter name to the path, etc.) or modify parameters. Any number of mutation layers can be included to focus on particular ways in which the endpoints can be modified.

As an example of changing the method, consider an endpoint having the method "GET" and a path of "/v2/Store/inventory." Candidate deceptive endpoints are shown below in Table 2.

TABLE 2

Example candidate deceptive endpoints through method modification.

| Base Path | Path | HTTP Method | Parameter Name | Parameter Description |
|---|---|---|---|---|
| /v2 | Store/inventory | POST | | |
| /v2 | Store/inventory | PUT | | |
| /v2 | Store/inventory | DELETE | | |

For each of the candidate deceptive endpoints shown in Table 2, a distance calculator 516 determines a score representing how close the candidates are to valid API endpoints for other applications stored in API endpoint data store 518. Distance calculator 516 can use various machine learning techniques, which often employ a concept of statistical distance as determined through calculation of a Pearson correlation distance, in which two objects are considered to be similar if their features are highly correlated, or other distance calculation to determine if objects are closely related. Distance calculator 516 can be part of validator 310 of FIG. 3. As a specific example, consider a deceptive endpoint candidate with the method "GET," base path "/v2" and path "Store/inventory." The words "store" and "inventory" can be separated, and API endpoint data store 518 (or a training dataset) can be searched for elements close to these words.

For example, given a dictionary of words and their corresponding vectors, the word vectors for "store" and "inventory" can be provided to the dictionary to find other words that are closest in meaning. The closest words are not necessarily synonyms and could be words that are often related to the original queries. For example, "store" could be close in distance to "location" (as in store location) or "franchiseID." Similarly, inventory could be close to "articles" or "catalog-samples." "Closest" words can refer to a number of distance determinations, such as the L1 or Euclidean distance between vectors, cosine distance, Wasserstein distance, or other distance between two vectors.

Based on the distance determined by distance calculator 516, one or more of the candidate deceptive endpoints are selected to be used as deceptive endpoints 522. Curator 524 is configured to do "clean up" and perform general management such as limiting the number of deceptive endpoints to keep the number reasonable for implementation or generating documentation (such as a Swagger file) with all of the deceptive endpoints. In some examples, the number of deceptive endpoints is kept to a percentage relative to valid endpoints (e.g., between 20 percent and 200 percent). Fewer deceptive endpoints generally makes the deception less obvious, and a higher number of deceptive endpoints will provide more traps but perhaps make the deception more obvious. The deceptive endpoints in deceptive endpoints 522 that are not removed by curator 524 are deployed in deceptive API 526. Deceptive API 526 can be implemented in the application, at a router, firewall, proxy in front of the application, or other location. In some examples, curator 524 is omitted.

API endpoint data store 518 can be populated from APIs for other applications 520. Extractor 502 can extract endpoints for the other applications, and flattener 506 can flatten the endpoints to generate endpoint entries for API endpoint data store 518.

Synonym fetcher 528 can inform modification of path or parameter by one of the mutation layers. For example, synonym fetcher 528 can use various machine learning techniques, including a natural language processing algorithm such as Word2vec, which uses neural networks to learn word associations, or WordNet, which is a database of semantic relationships between words, to find replacements for parameter names and path components after providing an input word.

In some examples, composer 530 is included in system 500. Composer 530 can automatically derive and configure mutation layers by analyzing the content of API endpoint data store 518 and using machine learning techniques to extract relationships across data rows. For example, using the Wasserstein distance, which is a distance function defined between probability distributions, composer 530 can infer that for a similar base path and path, an endpoint using the GET method often has a similar endpoint with the POST method. Similarly, composer 530 can infer that for similar base paths, an endpoint having its path contain the word "order" often has a similar endpoint with a Path containing the word "product." Composer 530 can also use probabilistic context-free grammars, which uses grammar theory to model symbol strings to understand natural language, to find relationships.

Figure 6:
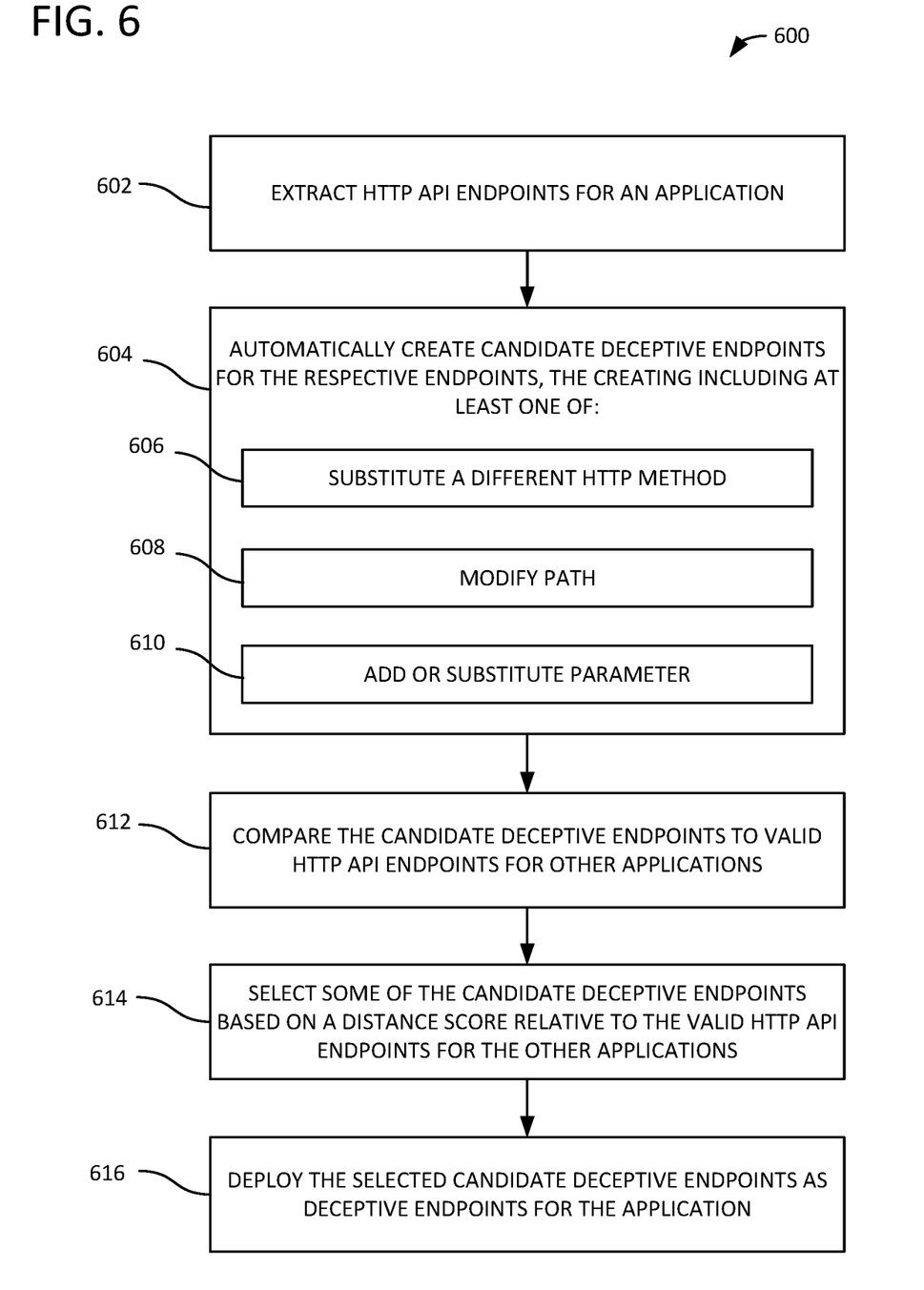
FIG. 6 illustrates an example method of securing an application in which HTTP API endpoints are modified.

FIG. 6 illustrates a method 600 for securing an application. In process block 602, a plurality of HTTP API endpoints for an application are extracted. The respective endpoints have an HTTP method and a path. In process block 604, candidate deceptive endpoints are automatically created for the respective endpoints. The creating comprises one or more of: substituting a different HTTP method for the HTTP method of the endpoint (process block 606), modifying the path of the endpoint (process block 608), or adding a new parameter or substituting the new parameter for an existing parameter of the endpoint (process block 610).

In process block 612, the candidate deceptive endpoints are compared to valid HTTP API endpoints for other applications. In process block 614, some of the candidate deceptive endpoints are selected based on a distance score relative to one or more of the valid HTTP API endpoints for the other applications. The selected candidate deceptive endpoints are deployed as deceptive endpoints for the application in process block 616. A requesting computing device accessing one of the deceptive endpoints indicates a malicious action.

Example Computing Systems

Figure 7:
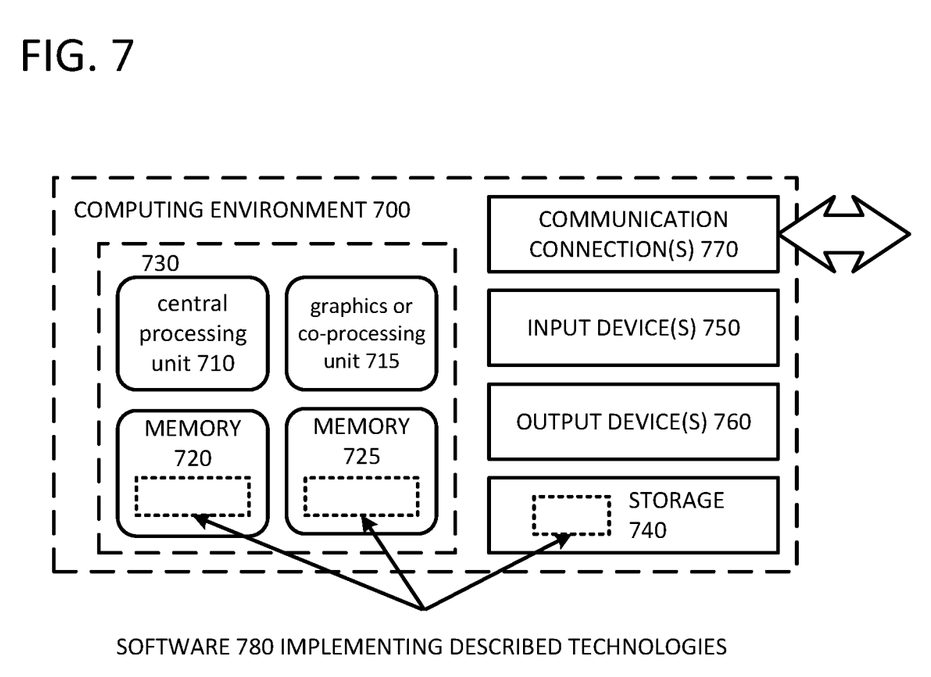
FIG. 7 is a diagram illustrating a generalized implementation environment in which some described examples can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720 and 725 can store deceptive endpoint generator 306 and validator 310 of FIG. 3 or deceptive endpoint generator 508, synonym fetcher 528, distance calculator 516, composer 530, or curator 524 of FIG. 5.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store deceptive endpoint generator 306 and validator 310 of FIG. 3 or deceptive endpoint generator 508, synonym fetcher 528, distance calculator 516, composer 530, or curator 524 of FIG. 5.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method for securing an application, the method comprising:
    retrieving a valid application programing interface (API) endpoint for an application;
    automatically modifying the valid API endpoint to create a deceptive endpoint for the application, wherein the deceptive endpoint is not a valid endpoint for the application, and wherein a requesting computing device accessing the deceptive endpoint indicates a malicious action; and
    deploying the deceptive endpoint;
    wherein automatically modifying the valid API endpoint comprises:
    identifying a portion of the valid API endpoint to modify;
    creating one or more candidate deceptive endpoints in which the identified portion is modified; and
    selecting at least one of the candidate deceptive endpoints as the deceptive endpoint;
    wherein the selecting comprises:
    comparing the one or more candidate deceptive endpoints to a group of valid API endpoints for other applications;
    scoring the candidate deceptive endpoints based on similarity to endpoints in the group of valid API endpoints for other applications; and
    selecting at least one candidate deceptive endpoint out of the candidate deceptive endpoints based on the scoring.

2. The method of claim 1, wherein the portion of the valid API endpoint to modify is one of a path, method, parameter, or XML tag of the endpoint.

3. The method of claim 1, wherein the deceptive endpoint is deployed at one of:
    a proxy between a requesting device and the application, a load balancer, a web application firewall, or a router.

4. The method of claim 1, further comprising upon determining that the deceptive endpoint has been accessed, generating an alert indicating that a user, account, or computing device associated with the access is malicious.

5. The method of claim 1, wherein the deceptive endpoint is deployed at a proxy between a requesting device and the application, the method further comprising:

upon determining that the deceptive endpoint has been accessed during a session with the application, establishing a session with an application clone and migrating the application session to the session with the application clone, wherein the session with the application clone includes at least some fake data in place of data accessible through the application session.

6. The method of claim 1, further comprising, after an update to the application, upon determining that the update makes the deceptive endpoint valid for the application, removing the deceptive endpoint.

7. A system, comprising:
a processor; and
one or more computer-readable storage media storing computer-readable instructions that, when executed by the processor, perform operations comprising:
extracting a plurality of valid application programing interface (API) endpoints for an application;
automatically modifying the valid API endpoints to create candidate deceptive endpoints that are not valid endpoints for the application;
comparing the candidate deceptive endpoints to valid API endpoints for other applications;
selecting the candidate deceptive endpoints that meet a similarity threshold with respect to one or more of the valid API endpoints for the other applications; and
deploying the selected candidate deceptive endpoints as deceptive endpoints for the application, wherein a requesting computing device accessing one of the deceptive endpoints indicates a malicious action;
wherein automatically modifying the valid API endpoints comprises:
identifying a portion of a valid API endpoint out of the valid API endpoints to modify;
creating one or more candidate deceptive endpoints in which the identified portion is modified; and
selecting at least one of the candidate deceptive endpoints as the deceptive endpoint.

8. The system of claim 7, wherein whether a candidate deceptive endpoint meets the similarity threshold is determined through a distance calculation.

9. The system of claim 7, wherein the valid API endpoints for the application are extracted from a documentation file for the application.

10. The system of claim 7, wherein automatically modifying the valid API endpoints comprises flattening the extracted valid API endpoints to create endpoint entries for different combinations of components of the respective valid API endpoints.

11. The system of claim 10, wherein the automatically modifying comprises changing one of a path, method, parameter, or XML tag of the endpoint entries.

12. The system of claim 11, wherein changing the path of the endpoint entries comprises automatically substituting a synonym or related word for one or more words in the path.

13. The system of claim 11, wherein changing the path of the endpoint entries comprises iterating a version number or numeral in the path.

14. The system of claim 11, wherein changing a parameter of the endpoint entries comprises automatically substituting a parameter based on parameters associated with the valid API endpoints for other applications or automatically substituting a synonym for the parameter.

15. The system of claim 11, wherein the valid API extracted endpoints are hypertext transfer protocol (HTTP) endpoints, and wherein changing a method of the endpoint entries comprises substituting one HTTP method for another HTTP method.

16. One or more non-transitory computer-readable storage media storing computer-executable instructions for securing an application, the securing comprising:
extracting a plurality of valid hypertext transfer protocol (HTTP) application programing interface (API) endpoints for an application, the valid endpoints having an HTTP method and a path;
automatically creating candidate deceptive endpoints for respective of the valid endpoints, the creating comprising one or more of:
substituting a different HTTP method for the HTTP method of the valid endpoint;
modifying the path of the valid endpoint; or
adding a new parameter or substituting the new parameter for an existing parameter of the valid endpoint;
comparing the candidate deceptive endpoints to valid HTTP API endpoints for other applications;
selecting some of the candidate deceptive endpoints based on a distance score relative to one or more of the valid HTTP API endpoints for the other applications; and
deploying the selected candidate deceptive endpoints as deceptive endpoints for the application, wherein a requesting computing device accessing one of the deceptive endpoints indicates a malicious action.

17. The non-transitory computer-readable storage media of claim 16, wherein
flattening the extracted valid endpoints to create endpoint entries for different combinations of path, method, or parameters of the respective valid endpoints, wherein the candidate deceptive endpoints are created using the endpoint entries.

18. The non-transitory computer-readable storage media of claim 16, wherein the valid HTTP API endpoints for the other applications are extracted from documentation files for the other applications and flattened.

* * * * *